Figure 1:
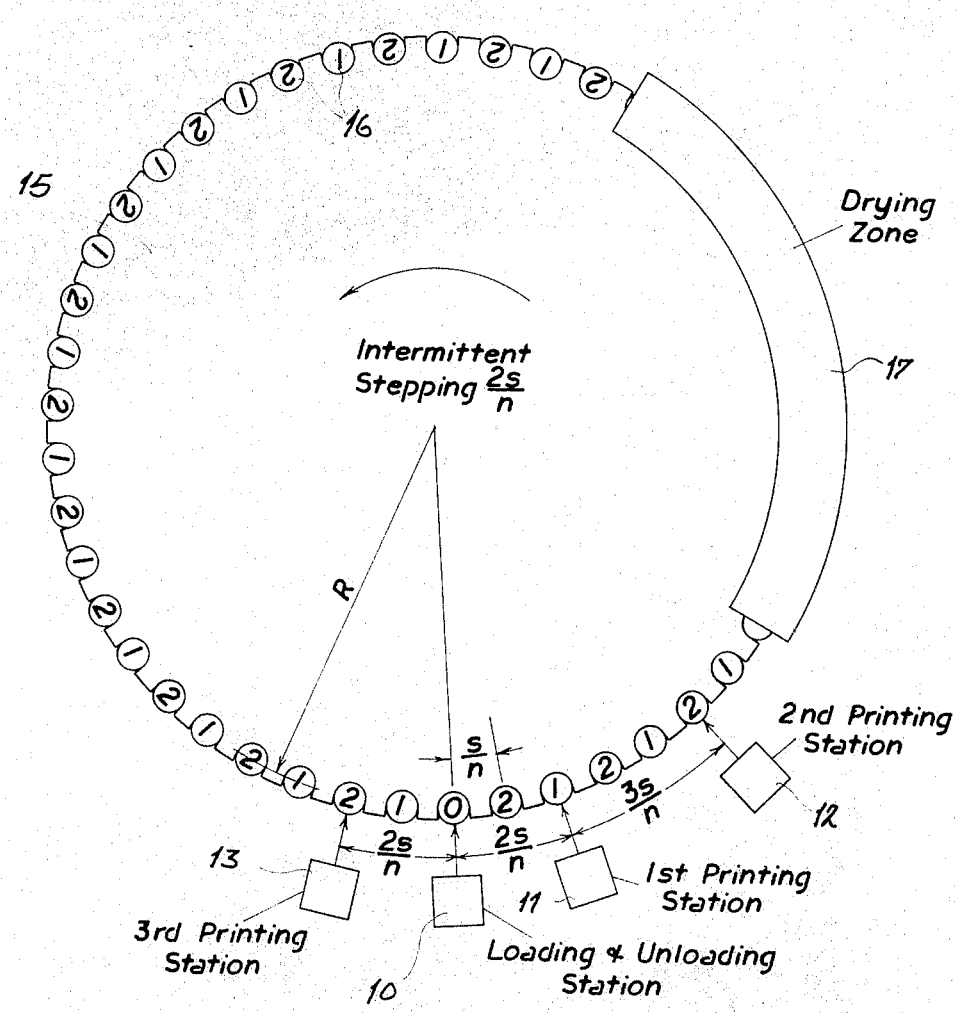

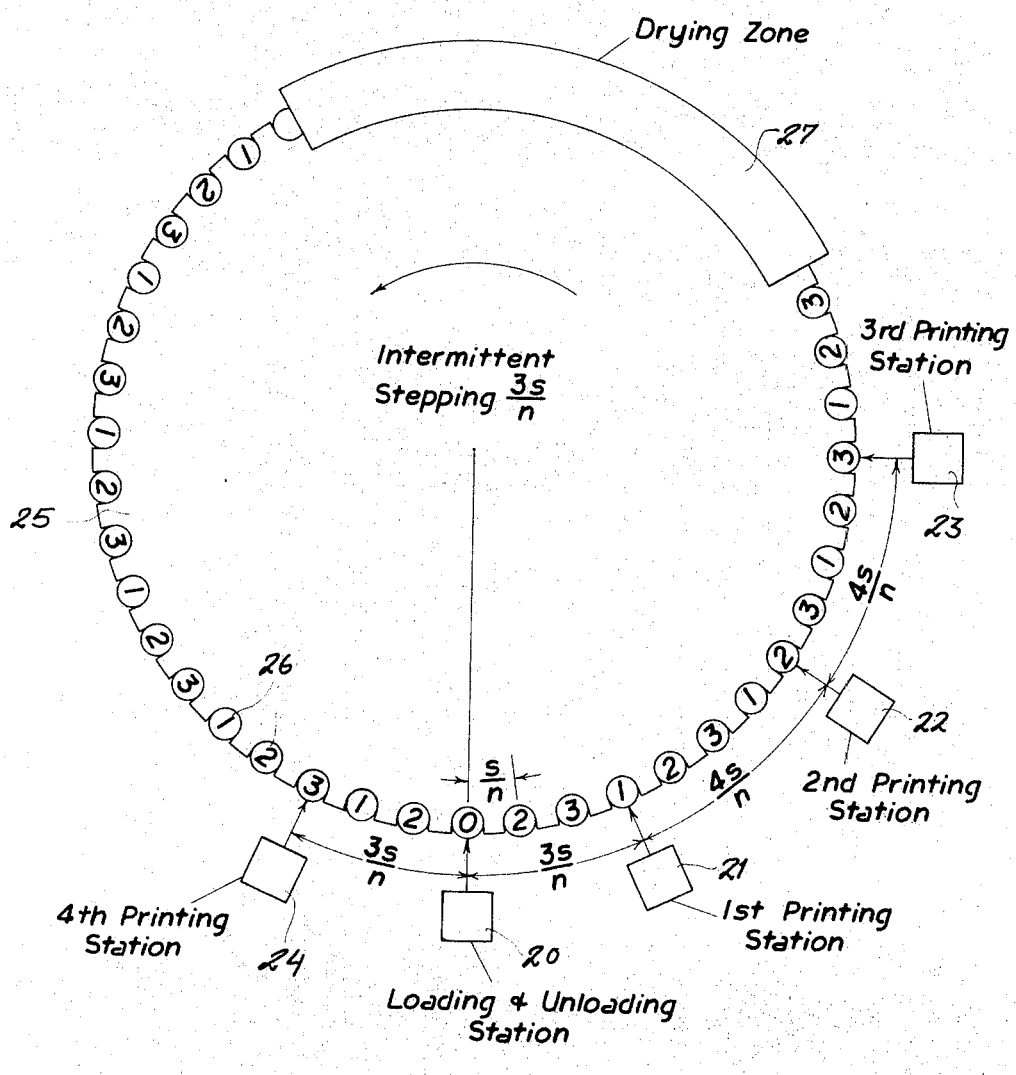

_United States Patent Office_

3,335,658
Patented Aug. 15, 1967

3,335,658
MACHINE FOR THE MULTIPLE PRINTING OF SOLID ARTICLES
Gerhard Uschmann, Klinkstrasse 33, Bunde, Westphalia, Germany
Filed Nov. 1, 1966, Ser. No. 591,274
6 Claims. (Cl. 101—35)

My present invention relates to a machine for the multiple printing, e.g., in different colors, of solid articles such as, for example, plastic containers of generally cylindrical shape which can be rotated about their axis for a screen-printing operation.

In my prior U.S. Patent No. 3,250,212, issued May 10, 1966, I have disclosed and claimed in apparatus of this general description wherein an endless conveyor has a multiplicity of holders for the articles to be printed, this conveyor passing through a drying oven at a location remote from a loading and unloading station. Two printing stations are disposed along the conveyor on opposite sides of the loading and unloading station so that a first printing operation is performed on the articles before they enter the drying zone, the articles emerging from that zone being then subjected to a second printing operation prior to being removed from the conveyor for final drying.

My present invention has for its object the provision of an improved system of the general type described in my prior patent in which more than two successive printing operations can be performed, with intervening drying, before the articles are taken off the conveyor.

This object is realized, in conformity with my present invention, by the provision of a conveyor which, in contradistinction to that of my prior patent, is intermittenly stepped by a distance corresponding to a multiple $m$ of the center-to-center spacing of adjacent holders, this spacing being given by the expression $s/n$ where $s$ is the effective peripheral length of the conveyor and $n$ is the number of holders equispaced therealong. A first printing station is spaced from the loading station, which usually will also double as the unloading station, by a distance (in the direction of conveyor motion) corresponding to the holder spacing $s/n$ multiplied by a whole number which is divisible by $m$ or, in other words, to the stepping distance $ms/n$ times an integer which preferably is equal to 1. A second printing station is interposed between the first printing station and the drying zone, the distance of the second printing station from the first one corresponding to the holder spacing $s/n$ times a whole number which is not divisible by $m$ so that an article coming from the first printing station will not stop at the second printing station before traversing the drying zone at least once. Moreover, since $m$ is not divisible into $n$, the article will also skip the loading station until it has stopped at the second printing station just before a further traverse of the drying zone. A final printing station may be provided, as in the system of my prior patent, just ahead of the loading and unloading station, the distance between these two stations being preferably equal to that between the loading station and the first printing station and being in any event equal to an integral number times $ms/n$. Thus, depending upon the choice of $m$, I may provide 2, 3 or even more printing stations between the loading station and the drying zone, in addition to a final printing station between the drying zone and the unloading station; even if that final printing station is omitted, the invention offers the advantage that the ink from the other printing stations is fully dried at the instant when the article is removed from the conveyor.

The invention will be described in greater detail with reference to the accompanying drawing in which FIGS. 1 and 2 are diagrammatic representations of two embodiments.

In FIG. 1 I have shown a conveyor 15 which is here shown as a circular disk although it could also comprise an endless band as shown in my above-identified prior patent. The disk 15 is provided along its periphery with a multiplicity of holders 16 for cylindrical articles although the exact shape of the articles is immaterial for purposes of the invention; thus, for example, the articles could also be flattened plastic bottles of the type illustrated in my prior patent. A drying zone 17 extends over a considerable arc length of disk 15 and may include the usual radiant or other heating means known in the printing art. The number $n$ of holders 16 is an odd integer and the center-to-center spacing of these holders has therefore the value $s/n$, $s$ being the peripheral length of the conveyor as measured along the holder axis and being thus equal to $2R\pi$.

In operation, an article to be printed is loaded at station 10 into a confronting holder 16 whenever the conveyor 15 comes to a halt. From its loading position, designated 0, the article then moves into successive positions 1 where it stops during the first revolution of the conveyor. In one of these positions 1, here specifically the one immediately following the loading position 0, the article confronts a first printing station 11 which may be of the character described in my prior patent, i.e., a station provided with means for lifting the article out of its holder and rotating it against a silk screen or other printing matrix before returning it to the holder. In principle, however, the printing stations illustrated diagrammatically in the drawing may also comprise printing heads which move toward the article on the conveyor, with or without rotation of the article in its holder.

After the first printing operation has been completed at station 11, the article passes a second printing station 12, similar to station 11, without stopping at that second station. With further intermittent rotation of conveyor 15, the article moves through the drying zone 17 and, upon approaching the loading and unloading station 10, skips a third printing station 13, again similar to station 11. The final position marked 1 is just ahead of position 0 so that the article, at this time, does not stop in front of the loading and unloading station 10 but is carried along for a second revolution of the conveyor, its positions during the revolution being designated 2. In one of these positions it confronts the second printing station 12 whose spacing from station 11 is here shown to be equal to $3s/n$, stations 11 and 13 being symmetrically positioned with reference to station 10 from which they are spaced by a distance $2s/n$. After the second printing operation, performed at station 12, the article passes once more through the drying zone 17 and, on its last stop before returning to station 10, confronts the third printing station 13 where a final printing operation takes place. The article is then removed, manually or otherwise, at station 10 and placed in another oven, not shown, for final drying.

In the system of page 2 I have used similar numerals to designate elements corresponding to those shown in FIG. 1, except for a replacement of the 1 in the tens digit by a 2. Moreover, the system of FIG. 2 includes a third printing station 23 between the second printing station 22 and the drying zone 27, a fourth printing station 24 being disposed ahead of the loading and unloading station 20. The number $n$ of holders 26 in FIG. 2 is equal to a multiple of 3 less 1, 3 being the number $m$ of holder spacings over which the conveyor 25 moves during a single step. Printing stations 21 and 24 are separated from loading and unloading station 20 by a distance $3s/n$, representing the length of a single step as in the preceding embodiment; the separation of station 22 from the preceding station 21 and the following station 23 is equal to $4s/n$.

In the embodiment of FIG. 2, an article inserted at station 20 (position 0) will stop at positions 1 during the first revolution of conveyor 25, thus halting at the first printing station 21 but skipping the other printing stations 22 and 23 before its first traverse of the drying zone 27. After such traverse, skipping stations 24 and 20, it halts in positions 2 during the second conveyor revolution, thus coming to rest at the second printing station 22 before passing again through the drying zone 27. The article bypasses once more the stations 24, 20 and 21, stopping in positions 3 during the third revolution which arrests it at the third printing station 23 ahead of drying zone 27. Toward the end of this last revolution the article stops at the fourth printing station 24 just before returning to station 20 for removal from its holder and final drying in a separate oven.

If the final printing stations 13 and 14 were omitted, the article would come fully dried off the conveyor.

I claim:

1. A machine for the printing of surfaces of solid articles in a plurality of successive operations, comprising an endless conveyor provided with a multiplicity of peripherally equispaced holders for articles to be printed, a loading station along said conveyor, heating means forming a drying zone along said conveyor beyond said loading station, a plurality of printing stations along said conveyor including a first printing station between said loading station and said drying zone and a second printing station in the vicinity of said first printing station, and drive means for intermittently stepping said conveyor by a constant distance equal to $ms/n$ where $s$ is the effective peripheral length of the conveyor and $n$ and $m$ are integers, $n$ being the number of holders on said conveyor, $m$ being greater than 1 and not divisible into $n$, the spacing of said first printing station from said loading station being equal to $s/n$ times a whole number divisible by $m$ while the spacing of said second printing station from said loading station is equal to $s/n$ times a whole number not divisible by $m$ whereby an article placed in a holder at said loading station stops at said first printing station before traversing said drying zone and subsequently stops at said second printing station while bypassing said loading and first printing stations for at least one other traverse of said drying zone.

2. A machine as defined in claim 1 wherein said printing stations include a final printing station located beyond said drying zone and preceding said loading station by a distance equal to $s/n$ times a whole number divisible by $m$.

3. A machine as defined in claim 2 wherein $m$ is equal to 2, said first printing station follows said loading station with a spacing equal to $2s/n$ and said second printing station follows said first printing station with a spacing equal to $3s/n$, said final printing station preceding said loading station with a spacing equal to $2s/n$.

4. A machine as defined in claim 1 wherein $m$ is greater than 2, said first printing station follows said loading station with a spacing equal to $ms/n$ and said second printing station follows said first printing station with a spacing equal to $(m\pm 1)s/n$, said printing stations including a third printing station which is located ahead of said drying zone and follows said second printing station with a spacing equal to that separating said second printing station from said first printing station.

5. A machine as defined in claim 4 wherein $m$ is equal to 3.

6. A machine as defined in claim 5 wherein said printing stations include a fourth printing station located beyond said drying zone and preceding said loading station by a distance equal to $3s/n$.

References Cited

UNITED STATES PATENTS

| | | | |
|---|---|---|---|
| 1,904,332 | 4/1933 | Sidebotham | 101—35 X |
| 3,267,842 | 8/1966 | Resnick et al. | 101—40 |
| 3,269,305 | 8/1966 | Rossi | 101—35 |

ROBERT E. PULFREY, *Primary Examiner.*

H. DINITZ, *Assistant Examiner.*